O. B. COLCORD.
HARVESTER RAKE.

No. 113,632. Patented Apr. 11, 1871.

Witnesses:
William W. Herthel
Robert Burns

Inventor:
O. B. Colcord by his Attys
Herthel & Co

United States Patent Office.

OTIS B. COLCORD, OF GREENVILLE, ILLINOIS.

Letters Patent No. 113,632, dated April 11, 1871.

IMPROVEMENT IN HARVESTER-RAKES.

The Schedule referred to in these Letters Patent and making part of the same.

*To all whom it may concern:*

Be it known that I, OTIS B. COLCORD, of Greenville, in the county of Bond and State of Illinois, have invented a new and useful Improvement in Reel-Rakes for Harvesters; and I do hereby declare the following to be a full, clear, and exact description thereof, sufficient to enable those skilled in the art to which my invention appertains to fully understand and to make and use the same, reference being had to the accompanying drawing forming part of this specification, and in which—

Figure 1:
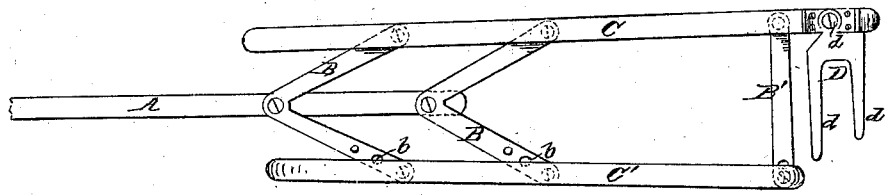

Figure 1 is a side view, and

Figure 2:
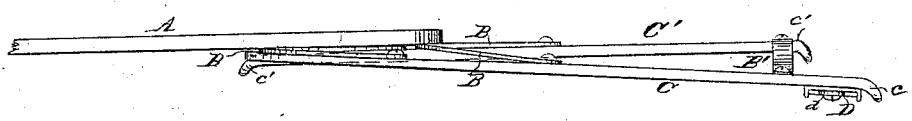

Figure 2 a plan of a beater.

Figure 3:
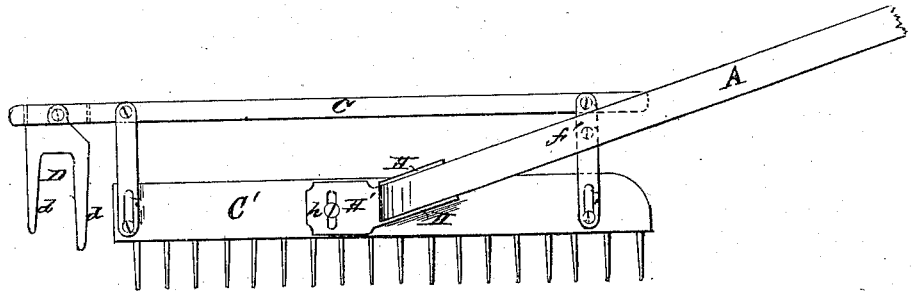
Figure 4:
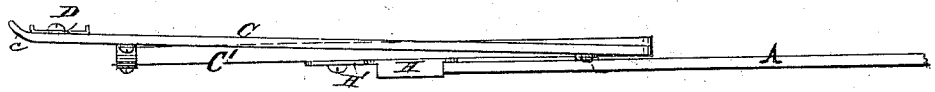

Figures 3 and 4 are similar views, showing some modifications in construction, to be hereinafter more fully referred to.

It is known that in the use of harvesters with the usual reel self-rakes it is necessary to adjust the rakes and beaters to the height of the grain, and that, nevertheless, in uneven grain or upon uneven ground, more or less grain will either avoid the beaters and rakes, or, being touched too low thereby, will be carried forward and frequently upward on the reel-arms instead of dropping upon the platform.

Furthermore, it is known that the action of many reel-rakes is to crowd the grain toward the divider-board or outer edge of the platform; and that, in many cases, stalks of grain are also from other causes piled up against the divider-board, and thus accumulate, there being in the ordinary self-rake no device for carrying off the grain thus deposited.

To avoid said defects and provide an improved self-rake is the object of my invention; and It consists in the extension of the upper beater-board over the divider-board, and the attachment to said extended portion of a rake-fork to rake off grain lodging upon or close to the divider-board, the fork being preferably pivoted to cause its teeth to move in vertical lines when the rake or beater is lifted by the action of the reel, to avoid carrying up grain in said fork.

The invention further consists in the general construction, arrangement, and combination of parts composing the device, as hereinafter described and claimed.

Referring to the drawing, wherein similar letters of reference indicate corresponding parts in the several figures—

A, figs. 1 and 2, represents the wooden beater-arm, which is secured to the iron arm of the reel in the usual manner.

The arm A is connected, by means of the V-shaped braces B B, with the upper and lower beater-boards C C', respectively, which boards are also connected, near their outer ends, by a brace, B'.

The lower board C' may be adjusted by means of holes $b\ b$, or slots in the braces B B B'.

The outer end of the board C' is curved, as at $c'$, to urge the grain to a compact form; and the end $c$ of the upper board C is similarly curved to draw the grain into the platform, the brace B' serving to prevent the lodgment of the grain between the boards C C'.

As heretofore stated, grain-stalks frequently lodge upon or close to the divider-board, and the ordinary rake or beater avoids these, so that gradually an accumulation forms which may cause breakage to the rake-teeth or arms.

To reach the space thus avoided by ordinary rakes and beaters, and, at the same time, to avoid undue weight of the rake or beater, the upper board C is extended out to pass beyond the divider-board, and to this extension is attached a light fork, D, (usually metallic.)

This fork has one or more teeth, $d$, of which the inner one, in case of a many-pronged fork, is usually made longer than the others to reach down beside the divider-board.

As the beater or rake is raised after its horizontal sweep over the platform is completed, grain might tangle in the fork D, or otherwise adhere and be carried up to drop in the reel. To avoid this the fork is, by preference, pivoted at $d$, so that it may always maintain a vertical position.

Wooden teeth might be used on the board C, but I prefer a metallic fork, because it requires no additional strength of the board to which it is attached over that in ordinary beaters.

In figs. 3 and 4 the lower board C' is shown provided with teeth, so as to serve as a rake as well as a beater.

The braces which connect the upper and lower boards are somewhat different from those shown in figs. 1 and 2; still their function is the same, and the board C' is adjustable by substantially similar means.

The beater-arm is adjustably attached to the lower board by means of a slotted socket, H H' $h$, and it is also secured at $f'$ to one of the braces.

In all forms of rakes and beaters I arrange the board C so that its outer end shall project beyond the lower board, while the inner ends of the upper and lower boards may be in the same vertical plane. This is to cause the outer part of the upper board to touch the grain-stalks before the beater below, and incline the grain to the platform and knives; therefore in high grain, and especially in adverse winds, the stalks, being prematurely bent at their upper ends to the platform, cannot fall back, but will drop forward on the platform, as required.

Having thus fully described my invention,

What I claim as new, and desire to secure by Letters Patent, is—

1. The combination of the extended upper board C and a fork, D, substantially as and for the purpose described.

2. An improved rake and beater, composed, essentially, of the board C, having a curved and extended end, the adjustable lower board C', a fork, D, connecting-braces, and a beater-arm, all constructed, arranged, and operating substantially as herein described.

In testimony of said invention I have hereunto set my hand in the presence of—

O. B. COLCORD.

Witnesses:
WILLIAM W. HERTHEL,
ROBERT BURNS.